US005322967A

United States Patent [19]

Matsuda

[11] Patent Number: 5,322,967

[45] Date of Patent: Jun. 21, 1994

[54] METHOD AND DEVICE FOR EXECUTING MUSICAL CONTROL WITH A PEDAL FOR AN ELECTRONIC MUSICAL INSTRUMENT

[75] Inventor: Toshinori Matsuda, Iwata, Japan

[73] Assignee: Kawai Musical Inst. Mfg. Co., Ltd., Sizuoka, Japan

[21] Appl. No.: 868,875

[22] Filed: Apr. 16, 1992

[30] Foreign Application Priority Data

Apr. 17, 1991 [JP] Japan .................................. 3-085225

[51] Int. Cl.[5] .......................... G10H 5/00; H04Q 1/18

[52] U.S. Cl. ........................................ 84/653; 84/656; 84/746

[58] Field of Search ................. 84/615, 617, 653, 655, 84/656, 746

[56] References Cited

U.S. PATENT DOCUMENTS 4,191,082 3/1980 Koike .................................... 84/622
4,450,745 5/1984 Nakada et al. ......................... 84/622
4,522,100 6/1985 Ishii ....................................... 84/609
4,674,382 6/1987 Yorihisa .
4,829,869 5/1989 Katada et al. ......................... 84/622
4,862,784 9/1989 Kimpara .............................. 84/622
4,909,121 3/1990 Usa et al. ............................. 84/606
5,095,800 3/1992 Matsuda ............................... 84/618
5,105,709 4/1992 Suzuki ................................. 84/615
5,119,710 6/1992 Tsurumi et al. ...................... 84/615
5,136,916 8/1992 Shibukawa ........................... 84/627
5,241,130 8/1993 Shibukawa ........................... 84/659

*Primary Examiner*—William M. Shoop, Jr.
*Assistant Examiner*—Jeffrey W. Donels

[57] ABSTRACT

According to the invention, a pedal operation is permitted independently for each group in a keyboard, and thus various ways of sounding musical tones can be realized. More specifically, a plurality of designation elements for designating the sounding of musical tones are divided into a plurality of groups, which are designated, and according to the group designation a musical control by a pedal operation is permitted independently for each group. Thus, a choice of a musical control by a pedal operation can be made for each group according to the group designation, thus permitting various ways of sounding musical tones.

22 Claims, 7 Drawing Sheets

METHOD AND DEVICE FOR EXECUTING MUSICAL CONTROL WITH A PEDAL FOR AN ELECTRONIC MUSICAL INSTRUMENT

BACKGROUND OF THE INVENTION

1. Field of the Invention

This invention relates to a device for and a method of pedal control for an electronic musical instrument, and more particularly, to improvements in the pedal operation.

2. Description of the Related Art

The prior art piano or similar musical instrument has a damper pedal, a shifting pedal, and a sostenuto pedal, etc. When the damper pedal is operated, a damper in the piano is separated from a string, allowing a continual sounding of a musical tone after the key is released; when the shifting pedal is operated, a hammer in the pedal is moved slightly to thereby cause a sounding of two of three strings; and when the sostenuto pedal is operated, only strings producing a sound at that moment are caused to continually produce a sound until the pedal is released. Namely, as described above, the pedals can effect various types of musical control; other pedals include a soft pedal and a mute pedal, etc.

The musical control by such pedals is effected uniformly over all of the keys of the piano, but in actual play, it is often desired to effect a musical control by the pedal operation for only a part of the keyboard. For example, it is often desired to divide the keyboard into an upper keyboard and a lower keyboard, and effect a musical control by the pedal operation over one of the keyboards alone. This desire is particularly pronounced with regard to a key split, in which different timbres or tone colors are produced by using the upper and lower keyboards.

SUMMARY OF THE INVENTION

An object of the present invention is to provide a pedal operation of an electronic musical instrument by which an independent pedal operation for each of a plurality of groups of sounding instruction means, such as a keyboard, is allowed.

According to the present invention, a plurality of sounding instruction means for instructing the sounding of musical tones are divided into a plurality of groups, which are designated, and a musical control in response to pedal operation is effected independently for each of the groups according to a group designation. Accordingly, it is possible to select a musical control by a pedal operation for each group, according to the group designation, to thus allow various ways of sounding musical tones.

DESCRIPTION OF THE PREFERRED EMBODIMENTS

Summary of the Embodiments

Figure 1:
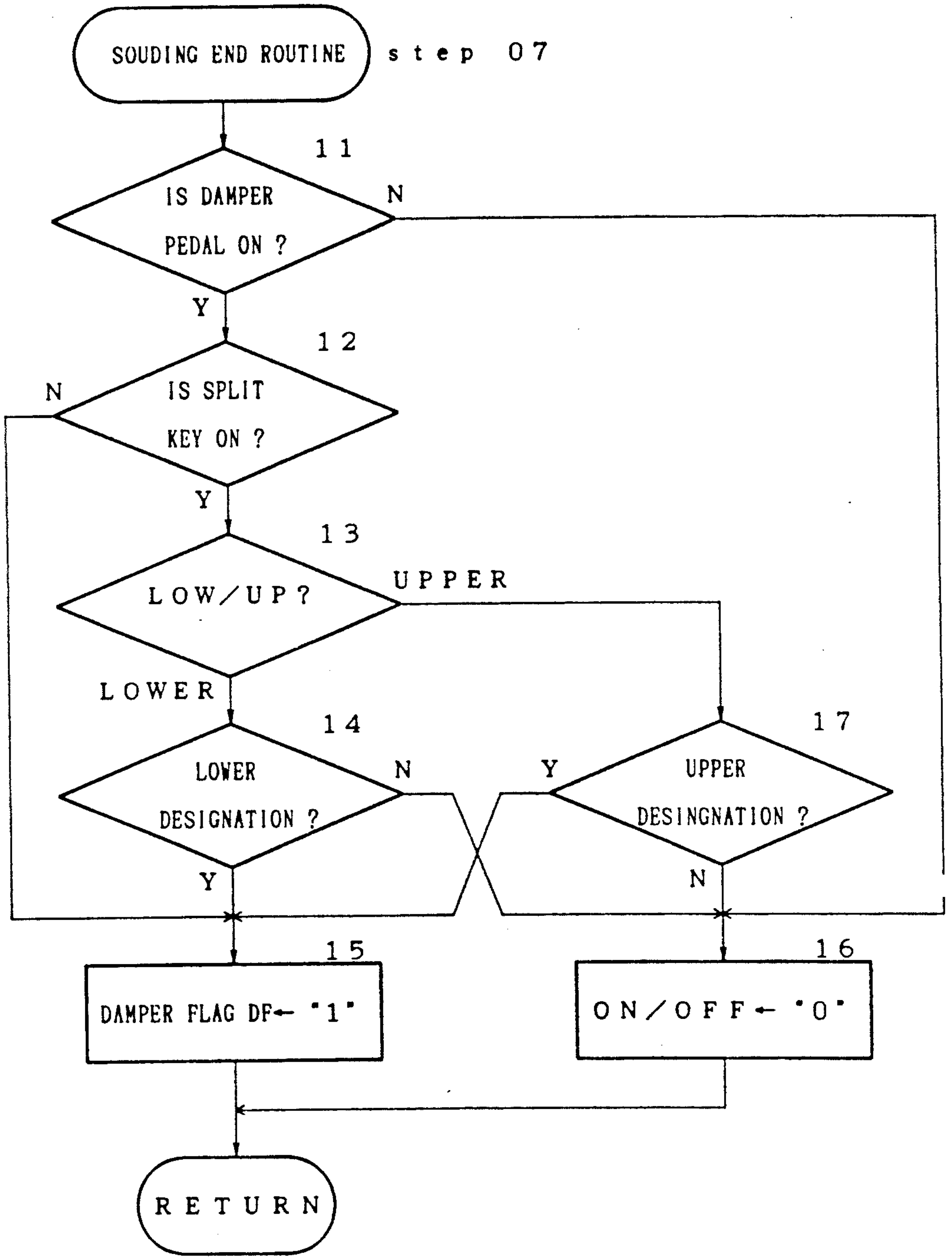
FIG. 1 is a flow chart showing a sounding end routine (step 07)

When the damper pedal 12 is turned "on" (step 11) of FIG. 1 for musical tones belonging to a lower keyboard 1*a* (step 13), and when a lower designation key 32 is "on" (step 14), a damper flag is set and the damper pedal 12 is made operative (step 15). When the lower designation key 32 is "off", a normal "key-off" routine is executed and the damper pedal 12 is maintained in an inoperative state (step 16). Namely, depending on the on/off state of the lower designation key 32, a choice can be made of whether or not the damper pedal 12 is operative with respect to musical tones belonging to the lower keyboard 1*a*.

When the damper pedal 12 is turned "on" (step 11) for musical tones belonging to an upper keyboard 1*b* (step 13), and when an upper designation key 32 is "on" (step 17), the damper flag is set and the damper pedal 12 is made operative (step 15). When the upper designation key 33 is "off", a normal "key-off" routine is executed and the damper pedal 12 is maintained in an inoperative state (step 16). Accordingly, depending on the on/off state of the upper designation key 33, a choice can be made of whether or not the damper pedal 12 is operative with respect to musical tones belonging to the upper keyboard 1*b*.

The damper flag set in step 15 is cleared (step 29) when the damper pedal 12 is turned "off", and at this time, a "key-off" routine is executed (step 28).

1. Overall Appearance Device

Figure 2:
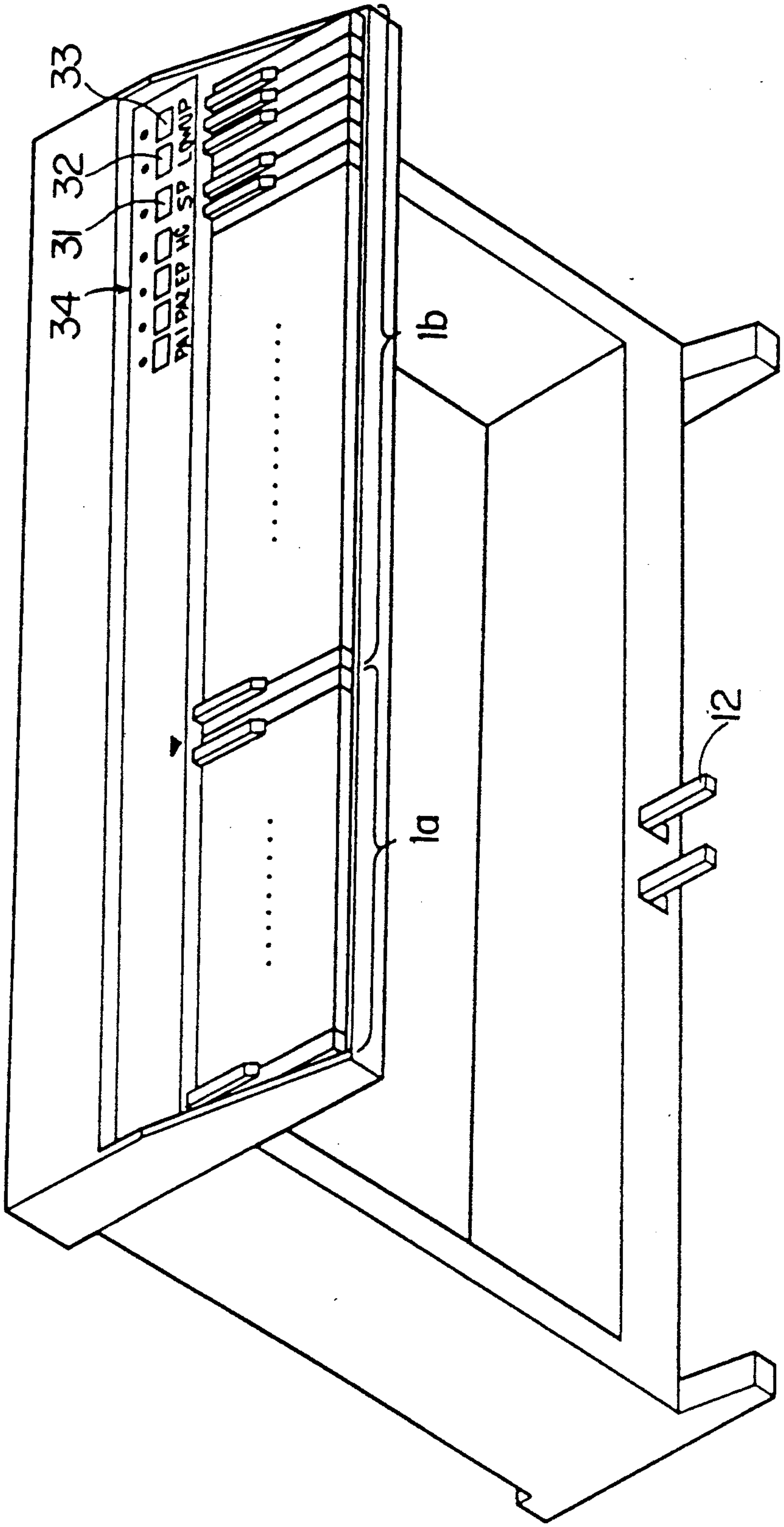
FIG. 2 is a perspective view of an electronic musical instrument.

FIG. 2 is a view showing the electronic musical instrument. As shown in the figure, a keyboard 1 has a plurality of white and black keys 11, and is divided into lower and upper keyboards 1*a* and 1*b*, i.e., and has two, a lower and an upper, key groups. The keyboard 1 is also provided with a panel switch group 3 that includes a split key 31, a lower designation key 32, an upper designation key 33, and a tone color key group 34.

The split key 31 is an on/off key for the split mode, and in the split mode, the keyboard 1 is divided into the two, i.e., lower and upper, key groups 1*a* and 1*b*, and different tone colors are provided by these key groups. The tone colors in the lower and upper keyboards 1*a* and 1*b* are set by the tone color key group 34. This setting is made to set a lower or an upper tone color, by switching a lower/upper select switch (not shown).

The lower designation key 32 is an on/off key for designating the lower keyboard 1*a*, and when the key 32 is "on", a musical control by the operation of a damper pedal 12, as described later, is effected with respect to musical tones produced by operating the lower keyboard 1*a*. The upper designation key 33 is an on/off key for designating the upper keyboard 1*b*, and when this key 33 is "on", a musical control by the operation of the damper pedal 12, as described later, is effected with respect to musical tones produced by operating the upper keyboard 1*b*.

The damper pedal 12 is provided in a lower part of the electronic musical instrument, and is depressed by foot to provide the musical control noted above. Under this control, a musical tone is continuously sounded after a key 11 on the keyboard 1 is turned off. This control, as noted above, is effected for each of the two, i.e., lower and upper, key groups of the keyboard 1 through an on/off operation of the designation keys 32 and 33.

2. Overall Circuitry

Figure 3:
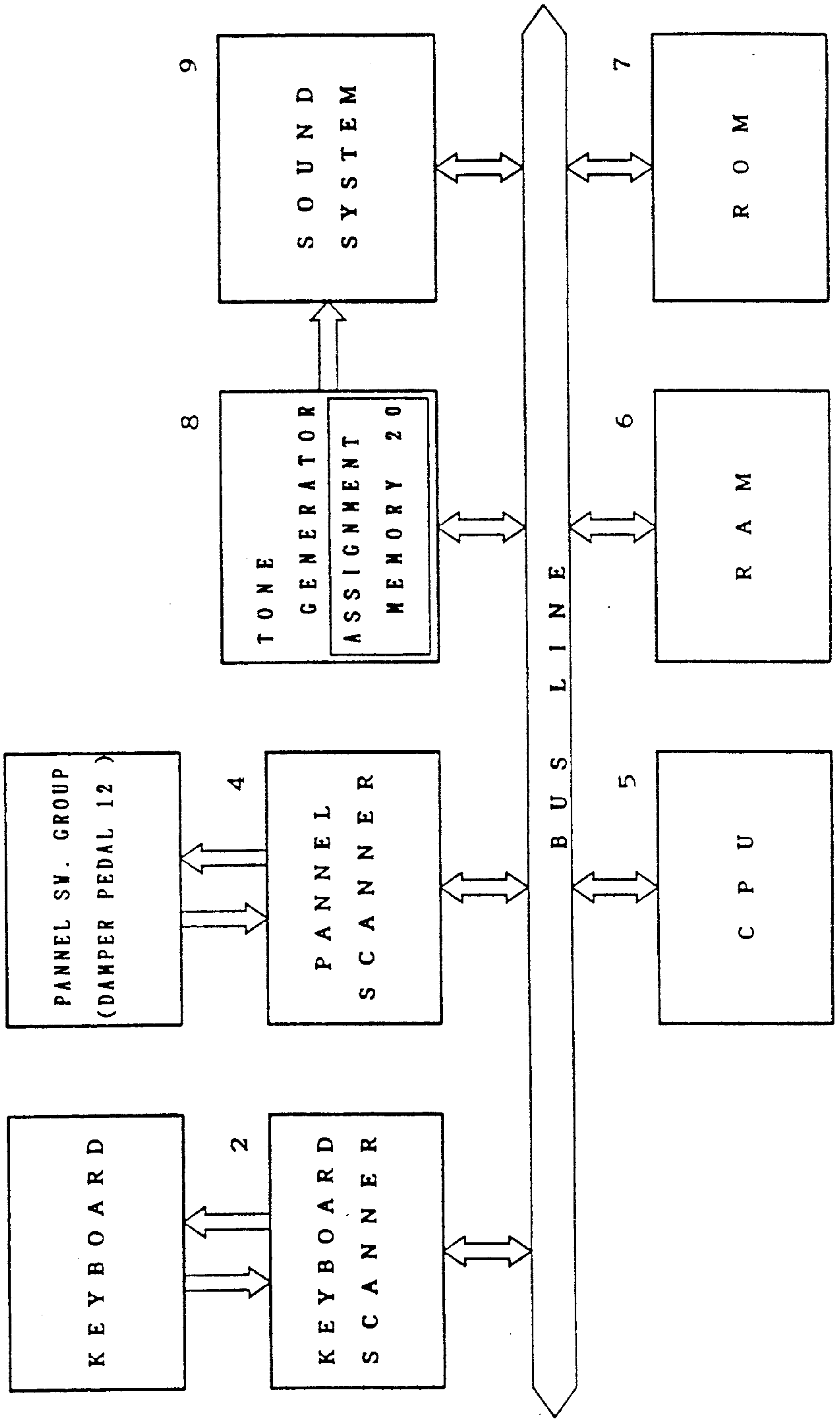
FIG. 3 is a block diagram showing the overall circuitry of the electronic musical instrument.

FIG. 3 shows the overall circuitry of the electronic musical instrument. The individual keys on the keyboard 1 are scanned by a keyboard scanner 2, which detects data indicating keys that are "on" or "off"; the detected data being written to a RAM 6 by a CPU 5. The CPU 5 discriminates the "on" and "off" events for the individual keys by comparing the written data with key on/off data stored in the RAM 6. Note, the keyboard 1 may be replaced by an organ, a harpsichord, a vibraphone, an electronic string instrument, an electronic wind instrument, an electronic percussion instrument (pads), or a computer keyboard, etc.

The individual keys 31 to 34 in the panel switch group 3 and the damper pedal 12 are scanned by a panel scanner 4, to obtain data indicating an "on" or "off" state, or to detect the extent of an operation of the keys and pedal; this data being written to the RAM 6 by the CPU 5. The CPU 5 discriminates the "on" and "off" events for the individual keys by comparing the written data with on/off data stored in the RAM 6.

The RAM 6 stores various routine data, in addition to the data noted above, and further contains a working register group 40, as described later. A ROM 7 stores programs corresponding to flow charts, as described later, and executed by the CPU 5 and programs for other routines. A tone generator generates tone data indicating the key number (i.e., tone pitch), touch, tone number (i.e., timbre), etc. input from the keyboard 1 and panel switch group 3. The tone generator 8 contains tone generation systems for a plurality of, for example, 16 or more, channels on a time division basis, for a polyphonic sounding of musical tones.

The tone data assigned to the individual channels is stored in an assignment memory 20, as described later. Note, the assignment memory 20 is provided in the tone generator 8 but can be provided in the RAM 6. The tone generator 8 is provided for each of the two, i.e., lower and upper, keyboards 1*a* and 1*b*, and correspondingly, the assignment memory 20 is also provided for each keyboard. Tone number data TN from a lower and an upper tone number register 45, as described later, is sent to the two tone generators 8, and tone waveform data generated by the two tone generators 8 is sent to a sounding system 9 for a mixing or accumulation before sounding.

3. Assignment Memory 20

Figure 4:
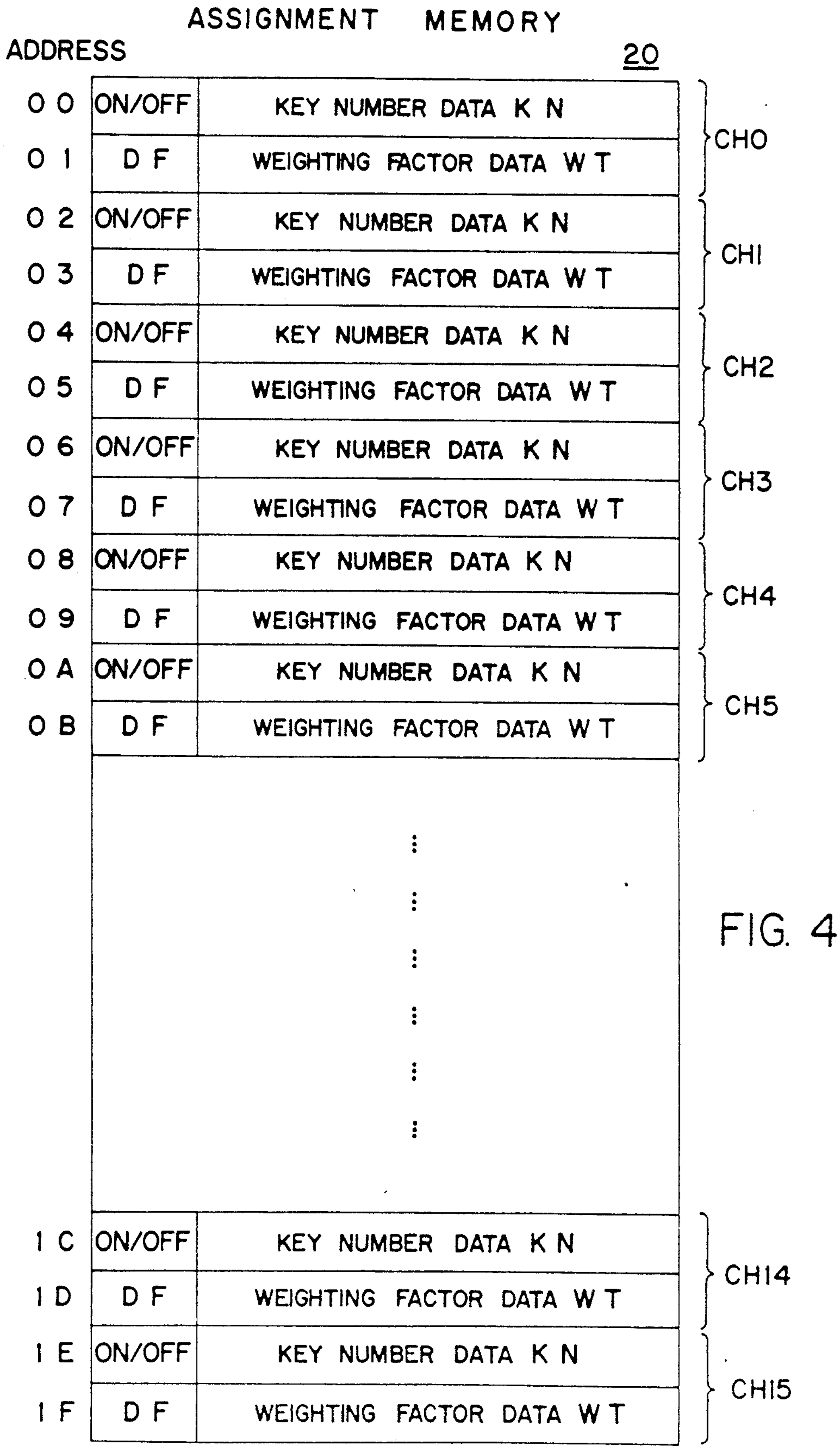
FIG. 4 is a view of an assignment memory 20.

FIG. 4 shows the assignment memory 20. The assignment memory 20 has memory areas for 16 or more channels, and tone data assigned to the 16 or more tone generation channels formed in the tone generator 8 is stored in these memory areas. The tone data stored in these channel memory areas includes on/off data, key number data KN, damper flag data DF, and weighting factor data WT, etc.

The on/off data indicates an "on" ("1") or "off" ("0") state of each key 11 on the keyboard 1; the key number data KN indicates the key number of each key on the keyboard 1; the damper flag data DF is made "1" and the on/off data noted above is made "off" ("0") when a "key-off" event occurs during the operation of the damper pedal 12. When the damper pedal 12 is turned off, on/off data concerning the damper flag data DF "1" is made "off" ("0"), to start a "key-off" routine.

The weighting factor data WT indicates the channel assignment priority, and is fully described in the specification of U.S. patent Ser. No. 07/616,182. The assignment memory 20 can store, in addition to the above data, tone number data TN and sound group data GN indicating of the tone source, etc.

4. Working Register Group 40

Figure 5:
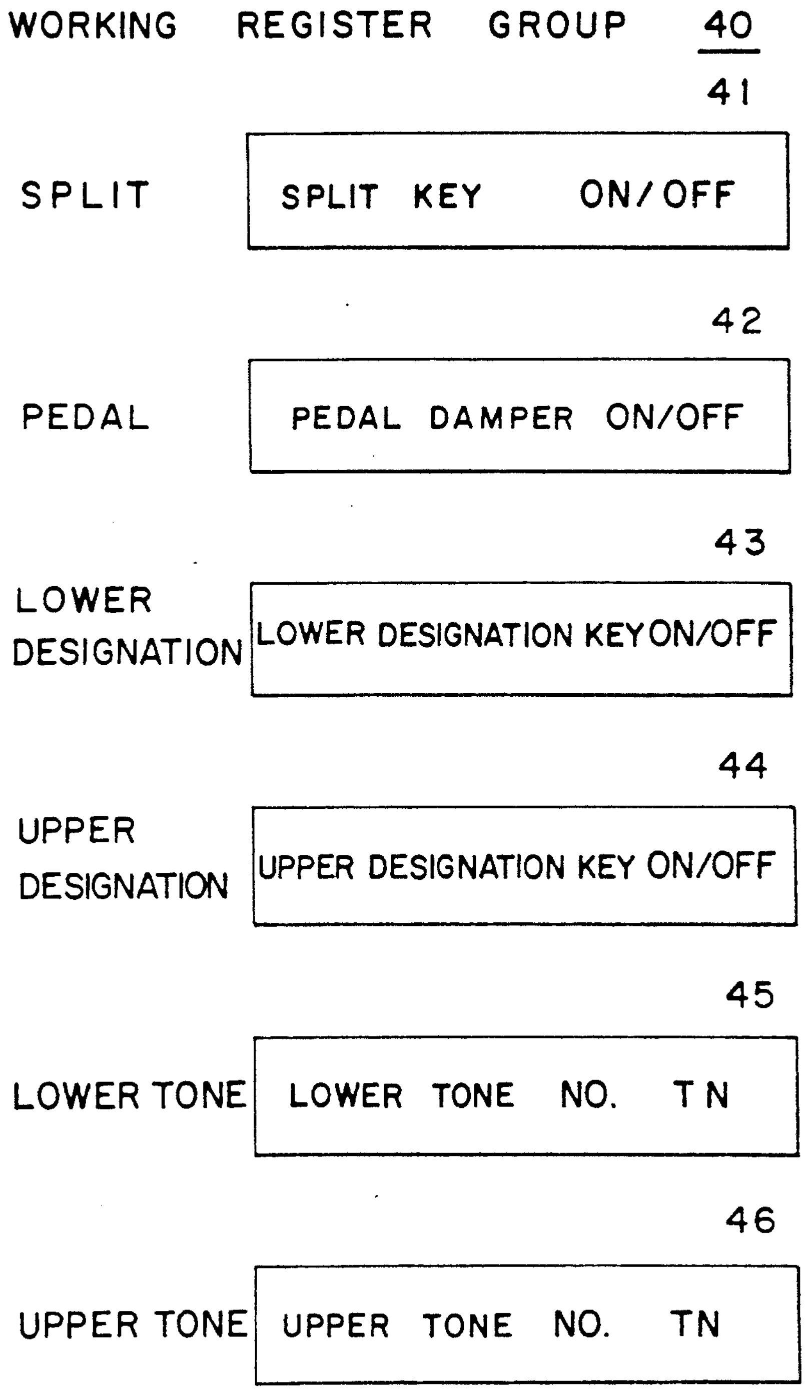
FIG. 5 is a view of a working register group 40.

FIG. 5 shows the working register group 40 in the RAM 6. This working register group 40 includes a split register 41, a pedal register 42, a lower designation register 43, an upper designation register 44, a lower tone number register 45, and an upper tone number register 46, etc.

The split register 41 holds data indicating the "on" ("1") and "off" ("0") state of the split key 31; the pedal register 42 holds data indicating the "on" ("1") and "off" ("0") state of the damper pedal 12; the lower designation register 43 holds data indicating the "on" ("1") and "off" ("0") state of the lower designation key 32; and the upper designation register 44 holds data indicating the "on" ("1") and "off" ("0") state of the upper designation key 33.

The lower tone number register 45 holds tone number data TN assigned to the lower keyboard 1*a* by the tone color key group 34, and the upper tone number register 46 holds tone number data TN assigned to the upper keyboard 1*b* by the tone color key group 34. The tone generator 8 generates tone waveform data and envelope data according to the tone number data TN set in the registers 45 and 46.

5. Overall Routine

Figure 6:
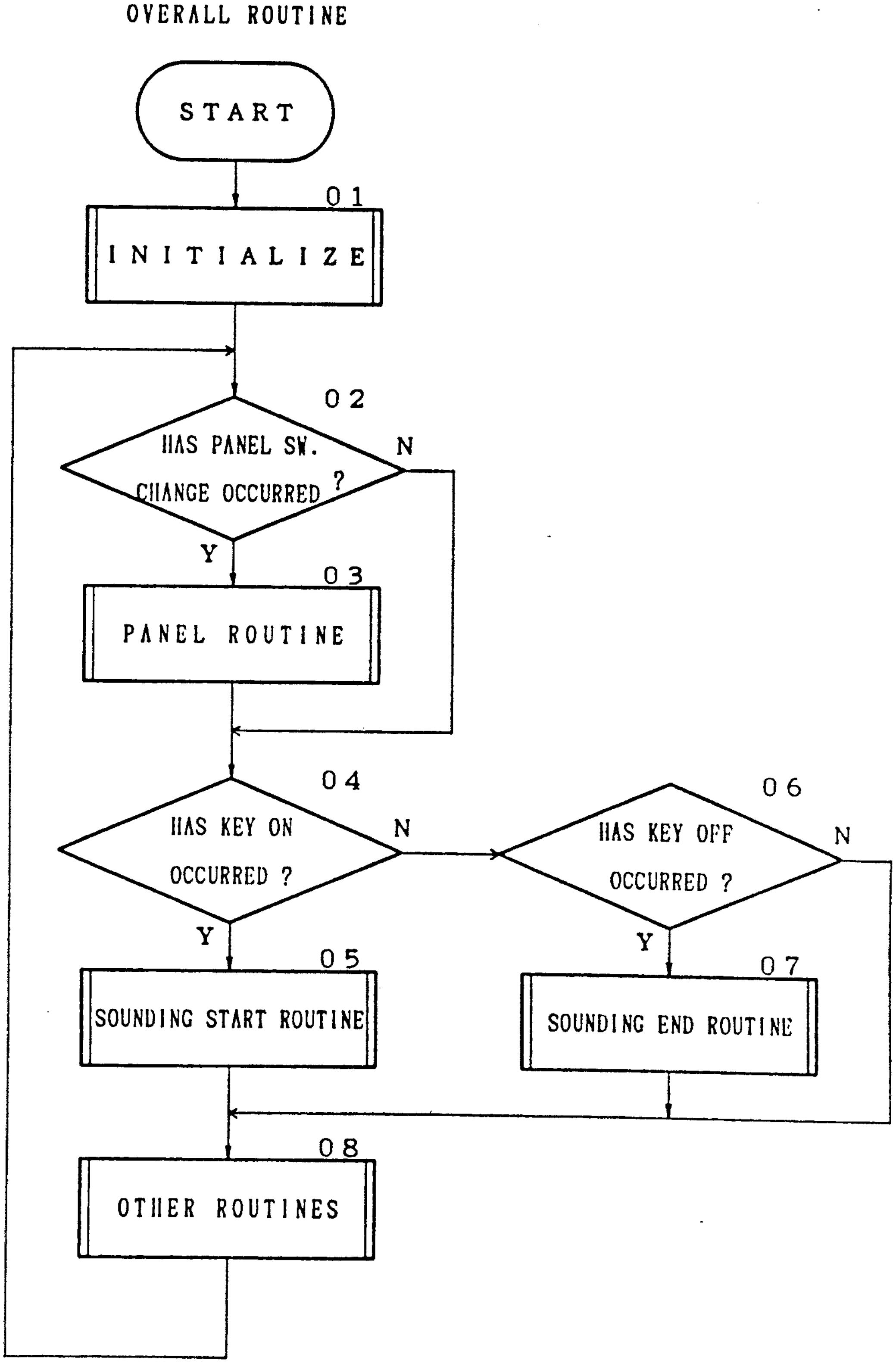
FIG. 6 is a flow chart showing an overall routine.

FIG. 6 is a flow chart showing an overall routine to be executed by the CPU 5. This routine is started by when power is supplied thereto. In this routine, after the initialization (step 01), it is determined whether a change has occurred in the state of the panel switch group 3 (step 02). If a change has occurred, a panel routine is executed (step 03). In the routine of the steps 02 and 03, a routine corresponding to the operation of the damper pedal 12 is also executed, and then the keyboard 1 is scanned. If a "key-on" event is detected, a sounding end routine is executed (step 17). Thereafter, other routines are executed (step 02), and the overall routine then returns to step 02.

6. Sounding End Routine

FIG. 1 is a flow chart showing the sounding end routine in step 07. In this routine, if the data in the pedal register 41 in the working register group 40 is "on" ("1") (step 11) and the data in the split register 42 is "on" ("1") (step 12), the CPU 5 determines whether the key number data KN concerning the "key-off" event belongs to the lower or upper keyboard 1*a* or 1*b* (step 13). This is done by determining whether the data is greater than the key number data KN of the split point, i.e. the point at which the keyboard 1 is divided into the lower and upper keyboards 1*a* and 1*b*. This split point key number data KN is stored in the ROM 7 if it is fixed, and is stored in the RAM 6 if it is variable.

If the key number data KN concerning the "key-off" event belongs to the lower keyboard 1*a*, it is determined whether data in the lower designation register 43 in the working register group 40 is "on" ("1") or "off" ("0") (step 14). If the data is "on" ("1") and the damper pedal 12 is operative with respect to the lower keyboard 1*a*, the damper flag data DF in the channel area of the assignment memory 20 concerning the "key-off" event is made "1" (step 15), and as a result, the musical tone is continually sounded regardless of a "key-off" event.

If the data in the lower designation register 43 is "off" ("0") and the damper pedal 12 is not operative with respect to the lower keyboard 1a, the on/off data in the channel area of the assignment memory 20 concerning the "key-off" is made "off" ("0") (step 16), and thereafter, a sounding end routine is executed in response to a "key-off" event. Namely, the above routine causes the damper pedal 12 to be operative or not operative with respect to the lower keyboard 1a.

If it is found in step 13 that the key number data KN concerning the "key-off" event belongs to the upper keyboard 1b, it is determined whether the data in the upper designation register 44 in the working register group 40 is "on" ("1") or "off" ("0") (step 17). If the data is "on" ("1") and the damper pedal 12 is operative with respect to the upper keyboard 1b, the damper flag data DF in the channel area of the assignment memory 20 concerning the "key-off" is made "1" (step 15), and accordingly, the musical tone is continually sounded regardless of a "key-off" event.

If the data in the upper designation register 44 is "off" ("0") and the damper pedal 12 is not operative with respect to the upper keyboard 1b, the on/off data in the channel area of the assignment memory 20 concerning the "key-off" is made "off" ("0") (step 16), and as a result, a sounding end routine is executed in response to a "key-off" event. Namely, the above routine causes the damper pedal 12 to be made operative or not operative with respect to the upper keyboard 1b.

If it is found in step 12 that the split mode is "off" ("0"), step 15 is executed, i.e., a damper routine is executed. Therefore, if the split key 31 is "off", the damper pedal 12 is operative with respect to the entire keyboard 1. If it is found in step 11 that the damper pedal 12 is "off", step 16 is executed for a normal key-off routine. The above pedal operation for each of the lower and upper keyboards 1a and 1b also can be realized with a different sustaining or a sostenuto pedal.

7. Panel Routine

Figure 7:
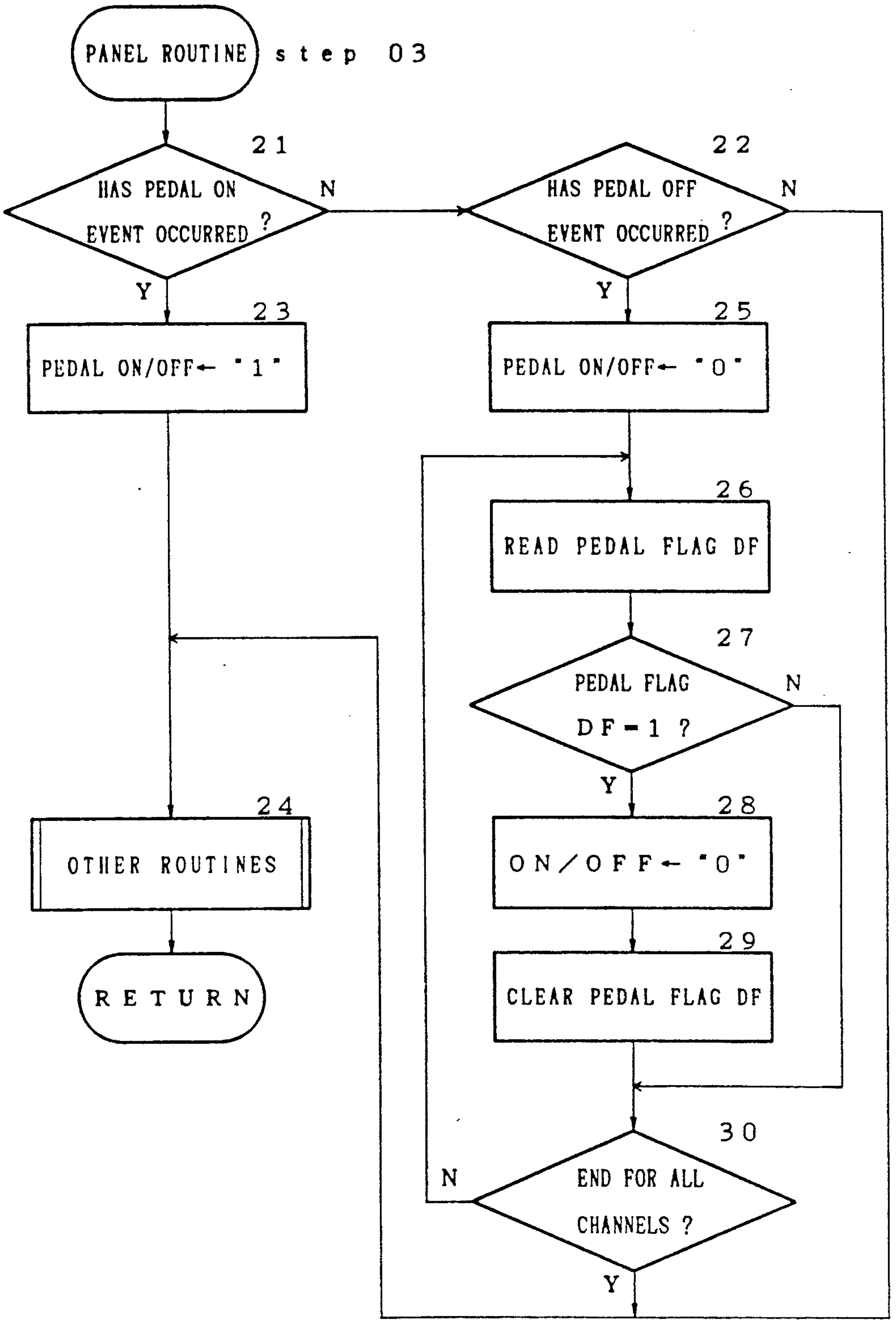
FIG. 7 is a flow chart showing a panel routine (step 03).

FIG. 7 is a flow chart showing the panel routine in step 03. In this routine, an on/off event with respect to the damper pedal 12 is determined by the scan routine (steps 21, 22). If an "on" event is found (step 21), "on" data "1" is set to a pedal register 42 in the working register group 40 (step 23), and other panel routines are executed (step 24).

If an "off" event is found in step 22, the data in the pedal register 42 is cleared and made "off" data (step 25), and then the pedal flag data in each channel memory area of the assignment memory 20 is read (step 26). If the data DF is "1" (step 27), the on/off data in the channel memory area is cleared and made "off" ("0") (step 28), the pedal flag data DF is cleared (step 29), and the routine of steps 26 through 29 is repeatedly executed for all channel memory areas (step 30).

Accordingly, when the damper pedal 12 is turned off, the sounding of tone data of keys 11 that were "off" is ended. The damper data DF of the tone data, the sounding of which is ended, was set to "1" in step 15.

The above embodiment is by no means limitative, and various changes and modifications are possible without departing from the scope and spirit of the invention. For example, the pedal operation for each of the lower and upper keyboards 1a and 1b is also possible with the soft pedal and mute pedal, etc. In such a case, the routines of steps 11 and 16 are not executed, and the on/off state of the pedal is determined in step 12. Then, envelope data from the envelope generator in the tone generator and tone waveform data from the tone waveform generator are multiplied with each other in multiplier. A separate multiplier or a level shifter is provided, between the envelope generator and the multiplier and in step 15, down data for lowering the level of the envelope data is supplied to the intervening multiplier or level shifter through a register or the like. If it is found in step 22 that the pedal is turned off, the level down data in the register is cleared. When envelope data is stored in each channel memory area of the assignment memory 51, a pedal "on" operation causes, for example, a 40% or 0.6 time level reduction of the envelope data, and a pedal "off" operation causes, for example, a 66% or 1.66 times level increase.

The keyboard 1 need not always be divided into the two, i.e., upper and lower, groups, but can also be divided for each tone pitch or each note range; for example, for each octave or half octave. In such a case, designation keys 32 and 33 are provided in a number corresponding to the number of octaves or half octaves, and further, an octave pertaining to an "off" key is determined in step 13, and the routine of steps 14 through 17 is executed for each octave.

Further, the individual groups of the keyboard 1 may be designated by a means other than turning on the designation keys 32 and 33. For example, it is possible to make the pedal operative or not operative at all times with respect to keys 11 in a specific group; for instance, it is possible to make the pedal not operative with respect to the upper keyboard 1a by turning on the accompaniment mode key. It is further possible to permit each group of the keyboard 1 to be designated when a specific piece of music is executed or when a specific mode is selected, as well as the above key "on" situation. For example, this can be executed when a repeat play or auto play is required or when a stereo mode or a fill-in mode is selected.

Further, the musical control by the pedal operation may be a tone color change, tone pitch change (transpose), tempo change, or musical effect, etc. In such a case, tone waveform data generated in the tone waveform generator noted above may be changed and then changed back, or all of the key number data KN set in the assignment memory 20 may be changed and then changed back, or this data may be processed with a cyclically varying value and then restored to the initial value, or the frequency of a clock signal of the electronic musical instrument may be changed and then changed back. Further, the pedals to which the invention is applicable include a foot pedal, a half pedal, a timpani pedal, an organ pedal, a foot switch, a bender, and a knee lever, etc.

Further, the routines of FIGS. 6 and 1 may be executed with respect to auto play data. Namely, the auto play data is read out from the RAM 6 or ROM 7 or supplied through the MIDI interface. In this case, the key number data KN determined in step 13 is the auto play data. Further, it is possible to dispense with the split key 31, split register 42, and the routine of step 12.

I claim:

1. A device for executing musical control with a pedal for an electronic musical instrument comprising:

a pedal, operable for instructing the musical control;

first discriminating means for discriminating an operation of said pedal;

a plurality of sounding instruction means for instructing a sounding of musical tones;

group designation means for designating at least one of a plurality of groups, into which said plurality of sounding instruction means are divided, and for making said pedal operative or inoperative;

second discrimination means for discriminating a status of the designation by said group designation means; and musical control means for individually executing the musical control of said pedal with respect to musical tones designated by the sounding instruction means for individual tones of said one group designated and made operative by said group designation means and for not executing the musical control of said pedal with respect to musical tones designated by the sounding instruction means for individual tones of said one group designated and made inoperative by said group designation means, according to said discriminations by said first discrimination means and second discrimination means.

2. The device of claim 1, wherein said first discrimination means discriminates an "on" operation of said pedal.

3. The device of claim 1, wherein said first discrimination means discriminates an "off" operation of said pedal.

4. The device of claim 1, wherein said pedal is a damper pedal.

5. The device of claim 1, wherein said plurality of sounding instruction means are instructed by a keyboard.

6. The device of claim 5, wherein said pedal is a damper pedal and, if a "key-off" event occurs during an "on" state of said damper pedal, a sounding of a desired tone is continued until said damper pedal is turned off.

7. The device of claim 4, wherein, if a "key-off" event occurs during an "on" state of said damper pedal, a sounding of a desired tone is continued until said damper pedal is turned off.

8. The device of claim 1, wherein said pedal is a mute pedal.

9. The device of claim 1, wherein said pedal is a soft pedal.

10. The device of claim 1, wherein the sounding instruction of one of said plurality of sounding instruction means is stored as auto play data.

11. The device of claim 1, wherein said group designation means includes means for dividing said plurality of sounding instruction means into a plurality of groups and means for designating said individual groups.

12. A method of executing musical control with a pedal for an electronic musical instrument, comprising the steps of:

(a) instructing the musical control with a pedal operation;

(b) discriminating the pedal operation;

(c) instructing a sounding of a plurality of musical tones;

(d) designating at least one of a plurality of groups, into which said plurality of musical tones are divided and making the pedal operative or inoperative;

(e) discriminating a status of the designation of said individual groups; and (f) individually executing the musical control of the pedal operation with respect to musical tones belonging to said one group designated and made inoperative in said step (d) and not executing the musical control of the pedal operation with respect to musical tones belonging to said one group designated and made inoperative in said step (d), according to a result of said discriminations made in said steps (b) and (e).

13. The method of claim 12, wherein the pedal operation in said step (a) is an "on" operation.

14. The method of claim 12, wherein the pedal operation in said step (a) is an "off" operation.

15. The method of claim 12, wherein said pedal is a damper pedal.

16. The method of claim 12, wherein said sounding of said plurality of musical tones in said step (c) is instructed by a keyboard.

17. The method of claim 15, wherein said sounding of said plurality of musical tones in said step (c) is instructed by a keyboard.

18. The method of claim 17, wherein said step (f) further comprises the sub-step of (f) (1) continuing a sounding of a desired tone until a damper pedal is turned off, even if an "key-off" even occurs during an "on" state of said damper pedal.

19. The method of claim 12, wherein said pedal is a mute pedal.

20. The method of claim 12, wherein said pedal is a soft pedal.

21. The method of claim 12, wherein said sounding of said plurality of musical tones instructed in said step (c) is stored as auto play data.

22. The method of claim 12, wherein said step (d) further comprises the sub-steps of (d) (1) dividing said plurality of musical tones into said plurality of groups and (d) (2) designating said groups individually.

* * * * *